United States Patent
Nakada et al.

(10) Patent No.: US 12,534,787 B2
(45) Date of Patent: Jan. 27, 2026

(54) HOT ROLLED STEEL SHEET

(71) Applicant: NIPPON STEEL CORPORATION, Tokyo (JP)

(72) Inventors: Kohei Nakada, Tokyo (JP); Takeshi Toyoda, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 586 days.

(21) Appl. No.: 17/785,301

(22) PCT Filed: Feb. 12, 2021

(86) PCT No.: PCT/JP2021/005325
§ 371 (c)(1),
(2) Date: Jun. 14, 2022

(87) PCT Pub. No.: WO2021/176999
PCT Pub. Date: Sep. 10, 2021

(65) Prior Publication Data
US 2023/0029319 A1    Jan. 26, 2023

(30) Foreign Application Priority Data
Mar. 2, 2020 (JP) ................. 2020-035215

(51) Int. Cl.
*C22C 38/40* (2006.01)
*C22C 38/00* (2006.01)
(Continued)

(52) U.S. Cl.
CPC ............ *C22C 38/40* (2013.01); *C22C 38/001* (2013.01); *C22C 38/002* (2013.01); *C22C 38/005* (2013.01); *C22C 38/02* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01);
(Continued)

(58) Field of Classification Search
None
See application file for complete search history.

(56) References Cited

U.S. PATENT DOCUMENTS 10,253,397 B2 * 4/2019 Kimura ................. C22C 38/14
11,680,305 B2 * 6/2023 Lee ...................... C21D 8/0226
                                                                420/104
(Continued)

FOREIGN PATENT DOCUMENTS

CN    102712963 A    10/2012
EP    3 228 721 A1    10/2017
(Continued)

*Primary Examiner* — Michael B Cleveland
*Assistant Examiner* — Austin Pollock
(74) *Attorney, Agent, or Firm* — Birch, Stewart, Kolasch & Birch, LLP

(57) ABSTRACT

Provided is a hot rolled steel sheet having a predetermined chemical composition and a microstructure comprising, by area ratio, pearlite: 90 to 100% and pro-eutectoid ferrite: 0 to 10%, wherein the pearlite has an average lamellar spacing of 0.08 to 0.30 μm, and the percentage of cementite in the pearlite having a major axis length of more than 0.3 μm and an aspect ratio of less than 3.0 is less than 15%.

16 Claims, 1 Drawing Sheet

(51) Int. Cl.
*C22C 38/02* (2006.01)
*C22C 38/06* (2006.01)
*C22C 38/18* (2006.01)
*C22C 38/20* (2006.01)
*C22C 38/22* (2006.01)
*C22C 38/24* (2006.01)
*C22C 38/26* (2006.01)
*C22C 38/28* (2006.01)
*C22C 38/32* (2006.01)
*C22C 38/38* (2006.01)
*C22C 38/42* (2006.01)
*C22C 38/44* (2006.01)
*C22C 38/48* (2006.01)
*C22C 38/54* (2006.01)
*C22C 38/58* (2006.01)

(52) U.S. Cl.
CPC .............. *C22C 38/38* (2013.01); *C22C 38/42* (2013.01); *C22C 38/44* (2013.01); *C22C 38/48* (2013.01); *C22C 38/54* (2013.01); *C22C 38/58* (2013.01); *C21D 2211/009* (2013.01)

(56) References Cited

U.S. PATENT DOCUMENTS

| | | | |
|---|---|---|---|
| 2014/0000767 A1 | 1/2014 | Yamasaki et al. | |
| 2015/0107725 A1 | 4/2015 | Im et al. | |
| 2015/0368768 A1 | 12/2015 | Aratani et al. | |
| 2016/0131222 A1 | 5/2016 | Tagashira et al. | |
| 2017/0114434 A1* | 4/2017 | Kohtake | C22C 38/08 |
| 2017/0191149 A1 | 7/2017 | Kimura et al. | |
| 2018/0127858 A1 | 5/2018 | Chassagne et al. | |
| 2019/0316235 A1 | 10/2019 | Lee et al. | |
| 2019/0338402 A1* | 11/2019 | Kimura | C22C 38/02 |
| 2022/0033927 A1 | 2/2022 | Nakada et al. | |

FOREIGN PATENT DOCUMENTS

| | | | | |
|---|---|---|---|---|
| JP | 2004300497 A | * | 10/2004 | |
| JP | 2009068081 A | * | 4/2009 | |
| JP | 2010138488 A | * | 6/2010 | |
| JP | 2011-99129 A | | 5/2011 | |
| JP | 2011-99132 A | | 5/2011 | |
| JP | 2011-530659 A | | 12/2011 | |
| JP | 5050386 B2 | | 10/2012 | |
| JP | 2014037592 A | * | 2/2014 | |
| JP | 2015-515548 A | | 5/2015 | |
| JP | 2016-98414 A | | 5/2016 | |
| JP | 6189819 B2 | * | 8/2017 | ............. C22C 38/50 |
| KR | 2012029347 A | * | 3/2012 | ............. C21D 8/02 |
| KR | 2013068402 A | * | 6/2013 | ............. C21D 1/18 |
| KR | 2019076786 A | * | 7/2019 | ........... C21D 8/0226 |
| WO | WO 2020/179737 A1 | | 9/2020 | |

* cited by examiner (a)
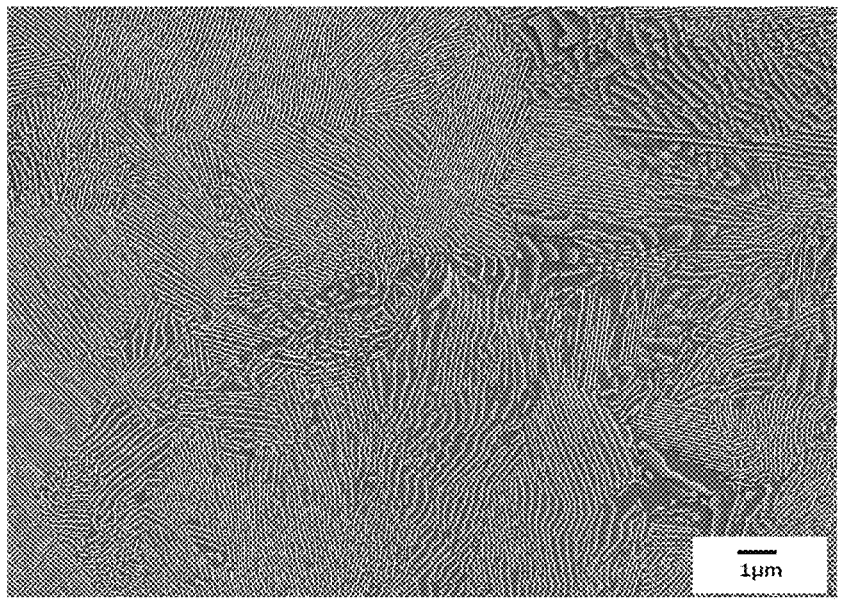
(b)
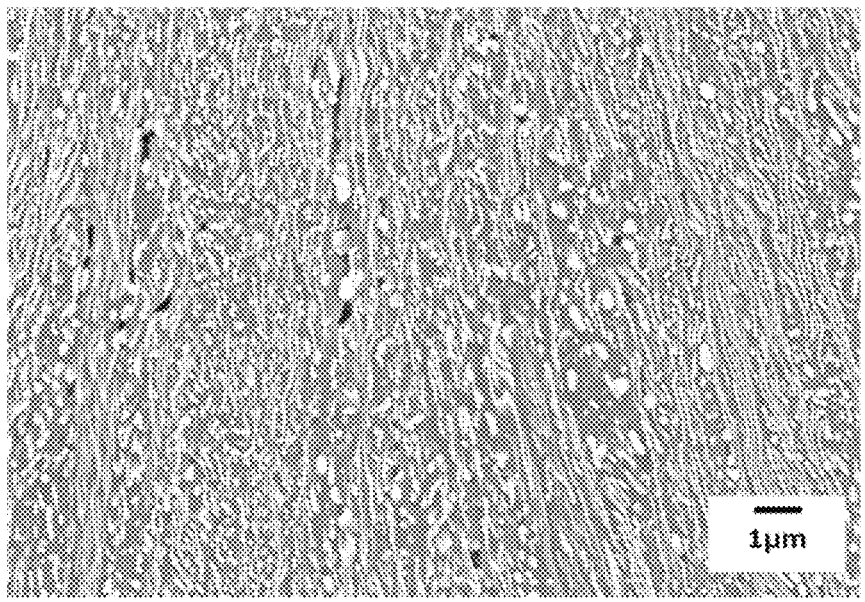

HOT ROLLED STEEL SHEET

FIELD

The present invention relates to hot rolled steel sheet, more particularly relates to hot rolled steel sheet which is used for a structural member of an automobile etc., which is high in strength, excellent in ductility, and further enables suppression of void formation at the time of stamping.

BACKGROUND

In recent years, in the automobile industry, reduction of the weight of car bodies has been sought from the viewpoint of improvement of fuel efficiency. On the other hand, due to tougher regulations regarding collision safety, addition of reinforcement parts in car body frames etc., have become necessary and have led to an increase of weight. In order to achieve both lighter weight of car bodies and collision safety, increasing the strength of the steel sheet used is one effective method. Due to such a background, efforts are underway to develop a high strength steel sheet.

On the other hand, many automotive components are created by press shaping. Generally, with higher strength, the shapeability of steel sheets will drop, with there being, for example, a drop in ductility indicators such as elongation and hole expandability. Since desired component shapes cannot be formed when these ductility indicators are below a certain level, achieving higher strength while ensuring a certain level of these mechanical properties or greater has become an important issue in the development of high strength steel sheets.

For example, to increase the strength of a steel sheet while securing ductility indicators, it has been proposed in the prior art to include a predetermined amount of pearlite in the microstructure of the steel sheet.

PTL 1 describes a high strength high ductility steel sheet comprising a composition of constituents containing, by mass %, C: 0.4 to 0.8%, Si: 0.8 to 3.0%, and Mn: 0.1 to 0.6% and a balance of iron and unavoidable impurities, and a steel microstructure including, by area ratio with respect to the entire microstructure, pearlite in 80% or more and residual austenite in 5% or more, an average lamellar spacing of the pearlite of 0.5 μm or less, an effective crystal grain size of ferrite surrounded by large angle grain boundaries of orientation differences of 15° or more of 20 μm or less, and carbides having a circle equivalent diameter of 0.1 μm or more of 5 or less per 400 μm². Further, PTL 1 describes that according to the above high strength high ductility steel sheet, it is possible to make pearlite the main structures while reducing its lamellar spacing to raise the yield strength (YS) and to make the effective ferrite grains finer to raise the stretch flangeability (λ) and, furthermore, to make the residual austenite disperse to raise the elongation (EL) and thereby secure a tensile strength (TS) of 980 MPa or more, a yield ratio YR (=YS/TS) of 0.8 or more, a tensile strength (TS)×elongation (EL) of 14000 MPa % or more, and a stretch flangeability (λ) of 35% or more.

PTL 2 describes a high carbon hot rolled steel sheet (hot rolled steel sheet) consisting of, by mass %, C: 0.60 to 1.20%, Si: 0.10 to 0.35%, Mn: 0.10 to 0.80%, P: greater than 0 and 0.03% or less, and S: greater than 0 and 0.03% or less, one or more of Ni: 0.25% or less (including 0), Cr: 0.30% or less (including 0), and Cu: 0.25% or less (including 0) and a balance of Fe and other unavoidable impurities, and containing micro pearlite structures having a width of cementite greater than 0 and 0.2 μm or less and a spacing between the cementite and cementite greater than 0 and 0.5 μm or less. Further, PTL 2 describes that the fine pearlite structure fraction is 90% or more and further describes that since the high carbon hot rolled steel sheet has micro pearlite structures, the final finished product can be given durability and strength.

PTL 3 describes a high strength steel sheet comprising a composition of constituents containing, by mass %, C: 0.3 to 0.85%, Si: 0.01 to 0.5%, Mn: 0.1 to 1.5%, P: 0.035% or less, S: 0.02% or less, Al: 0.08% or less, N: 0.01% or less, Cr: 2.0 to 4.0% and a balance of Fe and unavoidable impurities, and a microstructure consisting of rolled pearlite structures, wherein a ratio of amount of dissolved C calculated by a predetermined formula is 50% or more. Further, PTL 3 describes that according to the above high strength steel sheet, excellent bendability and higher strength of a tensile strength of 1500 MPa or more can be realized.

PTL 4 describes a hot rolled steel sheet comprising a predetermined chemical composition and a steel microstructure including, by area ratio, pearlite: 90 to 100%, pseudo pearlite: 0 to 10%, and pro-eutectoid ferrite: 0 to 1%, an average lamellar spacing of the pearlite of 0.20 μm or less, and an average pearlite block size of the pearlite of 20.0 μm or less. Further, PTL 4 describes that according to the above configuration, it is possible to obtain a hot rolled steel sheet which is high in strength with a tensile strength of 980 MPa or greater and which is excellent in ductility, hole expandability, and stampability. PTL 4 was published after the priority date of the present application and corresponds to related art not publicly-known prior art.

CITATIONS LIST

Patent Literature

[PTL 1] Japanese Unexamined Patent Publication No. 2016-098414
[PTL 2] Japanese Unexamined Patent Publication No. 2011-530659
[PTL 3] Japanese Unexamined Patent Publication No. 2011-099132
[PTL 4] WO 2020/179737

SUMMARY

Technical Problem

In the case of a steel sheet containing a relatively large amount of pearlite, micro voids tend to occur starting at carbides or the interface between the carbides and the parent phase on a stamped end face or sheared end face when stamping or shearing the steel sheet. These voids cause deterioration of the shapeability and/or fatigue resistance characteristics of the steel sheet after stamping or shearing. Therefore, when using a steel sheet containing a relatively large amount of pearlite, the formation of voids in the steel sheet after stamping or shearing is a problem. For example, while improvements to stampability were studied in PTL 4, there has not necessarily been enough studied from the viewpoint of suppressing such void formation.

Therefore, the present invention has as its object to provide, by a novel constitution, a hot rolled steel sheet which is high in strength, excellent in ductility, and further excellent in suppressing void formation at the time of stamping.

Solution To Problem

The inventors studied the chemical composition and microstructure of a hot rolled steel sheet so as to achieve the above object. As a result, the inventors discovered that it is important to make the structure of the hot rolled steel sheet mainly pearlite, which has a good balance of strength and ductility, and in addition to suitably control the microstructure of the pearlite. More specifically, the inventors discovered that by not including bainite and martensite, which are causes of a drop in ductility, in the microstructure and instead including pearlite in the hot rolled steel sheet in an area ratio of 90% or more, it is possible to ensure ductility, and, in addition, by making the lamellar spacing of the pearlite finer while maintaining the pearlite fraction of 90% or more, it is possible to increase the strength of the hot rolled steel sheet without detracting from the ductility, and, furthermore, by reducing the percentage of coarse spheroidal cementite in the pearlite, it is possible to suppress the formation of voids at the time of stamping, and thereby completed the present invention.

The present invention was completed based on the above findings. Specifically, it is as follows:

(1) A hot rolled steel sheet comprising a chemical composition comprising, by mass %,
C: 0.30 to 0.80%,
Si: 0.01 to 0.50%,
Mn: 0.50 to 2.00%,
P: 0.100% or less,
S: 0.0100% or less,
Al: 0.100% or less,
N: 0.0100% or less,
Cr: 0.30 to 1.00%,
Ti: 0 to 1.00%,
Nb: 0 to 0.10%,
V: 0 to 1.00%,
Cu: 0 to 1.00%,
Ni: 0 to 2.00%,
Mo: 0 to 0.40%,
B: 0 to 0.0100%,
Ca: 0 to 0.0050%,
REM: 0 to 0.005%, and
balance: Fe and impurities, and
a microstructure structure comprising, by area ratio,
pearlite: 90 to 100% and
pro-eutectoid ferrite: 0 to 10%, wherein
the pearlite has an average lamellar spacing of 0.08 to 0.30 µm, and
the percentage of cementite in the pearlite having a major axis length of more than 0.3 µm and an aspect ratio of less than 3.0 is less than 15%.

(2) The hot rolled steel sheet according to the above (1), wherein the chemical composition comprises, by mass %, one or more selected from the group consisting of
Ti: 0.01 to 1.00%,
Nb: 0.01 to 0.10%,
V: 0.01 to 1.00%,
Cu: 0.01 to 1.00%,
Ni: 0.10 to 2.00%,
Mo: 0.01 to 0.40%,
B: 0.0005 to 0.0100%,
Ca: 0.0005 to 0.0050%, and
REM: 0.0005 to 0.005%.

(3) The hot rolled steel sheet according to the above (1) or (2), wherein the tensile strength is 780 MPa or more.

Advantageous Effects of Invention

According to the present invention, it is possible to obtain a hot rolled steel sheet which is high in strength with a tensile strength of 780 MPa or greater, excellent in ductility, and enables suppression of void formation at the time of stamping.

BRIEF DESCRIPTION OF DRAWINGS

FIG. 1(a) is a view showing a typical microstructure of a hot rolled steel sheet corresponding to the examples, and (b) is a view showing void formation after stamping of a hot rolled steel sheet corresponding to a comparative example.

DESCRIPTION OF EMBODIMENTS

<Hot Rolled Steel Sheet>

The hot rolled steel sheet according to an embodiment of the present invention comprises, by mass %,
C: 0.30 to 0.80%,
Si: 0.01 to 0.50%,
Mn: 0.50 to 2.00%,
P: 0.100% or less,
S: 0.0100% or less,
Al: 0.100% or less,
N: 0.0100% or less,
Cr: 0.30 to 1.00%,
Ti: 0 to 1.00%,
Nb: 0 to 0.10%,
V: 0 to 1.00%,
Cu: 0 to 1.00%,
Ni: 0 to 2.00%,
Mo: 0 to 0.40%,
B: 0 to 0.0100%,
Ca: 0 to 0.0050%,
REM: 0 to 0.005%, and
balance: Fe and impurities, and
a microstructure comprising, by area ratio,
pearlite: 90 to 100% and
pro-eutectoid ferrite: 0 to 10%, wherein
the pearlite has an average lamellar spacing of 0.08 to 0.30 µm, and
the percentage of cementite in the pearlite having a major axis length of more than 0.3 µm and an aspect ratio of less than 3.0 is less than 15%.

First, the chemical composition of a hot rolled steel sheet according to an embodiment of the present invention and a slab used for its production will be explained. In the following explanation, the "%" of the units of contents of the elements contained in the hot rolled steel sheet and slab means "mass %" unless otherwise particularly indicated.

[C: 0.30 to 0.80%]

C is an element essential for securing the strength of the hot rolled steel sheet. To sufficiently obtain such an effect, the content of C is 0.30% or more. The content of C may also be 0.35% or more, 0.36% or more, 0.37% or more, 0.40% or more, 0.45% or more, or 0.50% or more. On the other hand, if excessively containing C, cementite precipitates and sometimes a sufficient pearlite fraction cannot be obtained or sometimes the ductility or weldability falls. For this reason, the content of C is 0.80% or less. The content of C may also be 0.77% or less, 0.75% or less, 0.70% or less, or 0.65% or less.

[Si: 0.01 to 0.50%]

Si is an element used for deoxidizing steel. However, if the content of Si is excessive, the chemical convertability falls and austenite remains in the microstructure of the steel sheet, and therefore the stampability of the steel sheet deteriorates. For this reason, the content of Si is 0.01 to 0.50%. The content of Si may also be 0.05% or more, 0.10% or more, or 0.15% or more and/or may be 0.45% or less, 0.40% or less, or 0.35% or less.

[Mn: 0.50 to 2.00%]

Mn is an element effective for delaying phase transformation of the steel and preventing phase transformation from occurring in the middle of cooling. However, if the content of Mn becomes excessive, microsegregation or macrosegregation easily occurs and the hole expandability deteriorates. For this reason, the content of Mn is 0.50 to 2.00%. The content of Mn may be 0.60% or more, 0.70% or more, or 0.90% or more and/or may be 1.90% or less, 1.70% or less, or 1.50% or less.

[P: 0.100% or less]

The lower the content of P, the better, but if excessive, it has a detrimental effect on the shapeability and weldability and causes a drop in the fatigue properties, and therefore the content is 0.100% or less. Preferably, it is 0.050% or less, more preferably 0.040% or less, or 0.030% or less. The content of P may be 0%, but excessive reduction invites a rise in costs, and therefore the content may preferably be 0.0001% or more.

[S: 0.0100% or less]

S forms MnS which acts as the starting points for fracture and causes a remarkable drop in the hole expandability of steel sheet. For this reason, the content of S is 0.0100% or less. The content of S is preferably 0.0090% or less, more preferably 0.0070% or less or 0.0060% or less. The content of S may be 0%, but excessive reduction invites a rise in costs, and therefore the content may preferably be 0.0001% or more.

[Al: 0.100% or less]

Al is an element used for deoxidizing steel. However, if the content of Al is excessive, inclusions increase and cause the workability of the steel sheet to deteriorate. For this reason, the content of Al is 0.100% or less. The content of Al may be 0%, but the content is preferably 0.001% or more or 0.003% or more. On the other hand, the content of Al may be 0.070% or less, 0.050% or less, or 0.040% or less.

[N: 0.0100% or less]

N bonds with the Al in the steel to form AlN which obstructs the increase in pearlite block size due to a pinning effect, thereby improving the toughness of the steel. However, if the content of N becomes excessive, the effect becomes saturated and rather a drop in toughness is caused. For this reason, the content of N is 0.0100% or less. The content of N is preferably 0.0090% or less or 0.0070% or less. From this viewpoint, there is no need to set a lower limit of the content of N. The content may be 0%. However, to reduce the content of N to less than 0.0010%, the steelmaking costs will swell. For this reason, the content of N is preferably 0.0010% or more.

[Cr: 0.30 to 1.00%]

Cr has the effect of making the lamellar spacing of the pearlite finer and thereby can secure the strength of the steel sheet. Further, Cr has the effect of suppressing spheroidization of cementite and can suppress spheroidization of the cementite in the steel sheet after coiling. Therefore, to reduce the percentage of coarse spheroidal cementite in the pearlite and suppress void formation at the time of stamping, it is necessary to contain a certain amount of Cr or more. For this reason, the lower limit of the content of Cr is 0.30%, preferably 0.40%, more preferably 0.45% or 0.50%. Furthermore, since Cr stabilizes cementite, the inclusion of Cr allows the pearlite formation region to be expanded to the low carbon side. For this reason, by including Cr in a suitable amount, i.e., an amount of 0.30% or more, it is possible to achieve a pearlite fraction of 90% or more even with a relatively low C content. On the other hand, excessively adding Cr sometimes delays pearlite transformation, creating hard structures such as bainite and martensite, making it difficult to obtain a pearlite fraction of 90% or more. Alternatively, excessive Cr sometimes results in the average lamellar spacing of the pearlite becoming too small, causing a drop in ductility accompanying the improvement in tensile strength. For this reason, the upper limit of the content of Cr is 1.00%, preferably 0.90%, more preferably 0.85% or 0.80%.

The basic composition of constituents of the hot rolled steel sheet according to an embodiment of the present invention and the slab used for its production is as explained above. Furthermore, the hot rolled steel sheet and slab may if necessary contain any of the following optional elements. Note that, the lower limit of the contents of the optional elements when not contained is 0%.

[Ti: 0 to 1.00%]
[Nb: 0 to 0.10%]
[V: 0 to 1.00%]

Ti, Nb, and V contribute to improvement of the steel sheet strength by the precipitation of carbides. The contents of Ti, Nb, and V may be 0%, but one selected from these may be included alone, or two or more may be included compositely, as needed, to obtain this effect. However, if any of these elements is included in excess, a large amount of carbides is formed and the toughness of the steel sheet is lowered. For this reason, the content of Ti is preferably 1.00% or less or 0.60% or less, the content of Nb is preferably 0.10% or less or 0.08% or less, and the content of V is preferably 1.00% or less or 0.60% or less. On the other hand, to sufficiently obtain this effect, the lower limit values of the contents of Ti, Nb, and V may be, for all of the elements, 0.01% or 0.05%.

[Cu: 0 to 1.00%]

Cu is an element able to dissolve in the steel and improve the strength without detracting from the toughness. The content of Cu may be 0%, but Cu may be included as required to obtain the above effect. However, if the content is excessive, due to the increase in precipitates, at the time of hot working, microcracks are sometimes formed at the surface. Therefore, the content of Cu is preferably 1.00% or less or 0.60% or less. To sufficiently obtain such an effect, the content of Cu is preferably 0.01% or more, more preferably 0.05% or more.

[Ni: 0 to 2.00%]

Ni is an element which can dissolve in the steel to raise the strength without detracting from the toughness. The content of Ni may be 0%, but Ni may be included as needed to obtain that effect. However, Ni is an expensive element. Excessive addition invites a rise in costs. Therefore, the content of Ni is preferably 2.00% or less or 1.00% or less. To sufficiently obtain that effect, the content of Ni is preferably 0.10% or more, more preferably 0.20% or more.

[Mo: 0 to 0.40%]

Mo is an element increasing the strength of steel. The content of Mo may be 0%, but Mo may be included as needed to obtain that effect. However, if the content is excessive, the drop in toughness accompanying an increase in strength becomes remarkable. Therefore, the content of Mo is preferably 0.40% or less or 0.20% or less. To sufficiently obtain that effect, the content of Mo is preferably 0.01% or more, more preferably 0.05% or more.

[B: 0 to 0.0100%]

B has the effect of segregating at the grain boundaries and raising the intergranular strength. The content of B may be 0%, but B may be included as needed to obtain that effect.

However, if the content is excessive, the effect becomes saturated and the costs of the raw materials swell. For this reason, the content of B is preferably 0.0100% or less. The content of B is more preferably 0.0080% or less or 0.0060% or less. To sufficiently obtain the above effect, the content of B is preferably 0.0005% or more, more preferably 0.0010% or more.

[Ca: 0 to 0.0050%]

Ca is an element which controls the form of the nonmetallic inclusions which act as the starting points of fracture and cause deterioration of workability and which improves the workability. The content of Ca may be 0%, but Ca may be included as needed to obtain that effect. However, if the content is excessive, the effect becomes saturated and the costs of the raw materials swell. For this reason, the content of Ca is preferably 0.0050% or less. The content of Ca is more preferably 0.0045% or less or 0.0040% or less. To sufficiently obtain the above effect, the content of Ca is preferably 0.0005% or more, more preferably 0.0010% or more.

[REM: 0 to 0.005%]

REM is an element improving the toughness of the weld zone by addition in fine amounts. The content of the REM may also be 0%, but these may be included in accordance with need to obtain the above effect. However, if excessively added, conversely the weldability deteriorates. For this reason, the content of the REM is preferably 0.005% or less or 0.004% or less. To sufficiently obtain the above effect, the content of REM is preferably 0.0005% or more, more preferably 0.001% or more. Note that, "REM" is the general term for a total 17 elements of Sc, Y, and the lanthanoids. The content of REM means the total amount of the above elements.

In the hot rolled steel sheet according to an embodiment of the present invention, the balance aside from the constituents explained above is comprised of Fe and impurities. Impurities mean substances that enter from the ore and scrap used as raw materials or from the production environment and the like and are allowable to the extent that they do not adversely affect the hot rolled steel sheet according to an embodiment of the present invention.

Next, the reasons for limitation of the structure of the hot rolled steel sheet according to an embodiment of the present invention will be explained.

[Pearlite: 90 to 100%]

By making the microstructure of the steel sheet a structure mainly comprised of pearlite, it is possible to obtain a steel sheet maintaining a high strength while being excellent in ductility. If the pearlite is present in an area ratio of less than 90%, the strength or ductility cannot be secured and/or the ferrite-pearlite boundaries which could become starting points of void formation at the time of stamping increase due to the unevenness of the structure. For this reason, the pearlite in the microstructure of the hot rolled steel sheet according to an embodiment of the present invention may be present in an area ratio of 90% or more. The pearlite is preferably contained at 95% or more, 96% or more, 97% or more, 98% or more, or 99% or more. It may also be 100%.

[Pro-eutectoid Ferrite: 0 to 10%]

The area ratio of the remaining structures other than the pearlite may be 0%, but if there are remaining structures present, they are limited to pro-eutectoid ferrite. Therefore, pro-eutectoid ferrite is present in an area ratio of 0 to 10%. By making the remaining structure pro-eutectoid ferrite, it is possible to ensure good ductility and stampability. Further, in the present invention, "pro-eutectoid ferrite" means ferrite precipitating as primary crystals in the cooling stage after hot rolling and substantially not containing cementite, i.e., having a fraction of cementite in the crystal grains of an area ratio of less than 1%. Note that, the pro-eutectoid ferrite may be present in, for example, an area ratio of 5% or less, 4% or less, 3% or less, 2% or less, or 1% or less. In a hot rolled steel sheet according to an embodiment of the present invention, either residual austenite, pro-eutectoid cementite, bainite, and martensite are not present in the microstructure or are substantially not present. "Substantially not present" means the area ratios of these structures are, even in total, less than 0.5%. It is difficult to accurately measure the total amount of such fine structures. Further, their effects can be ignored. Therefore, when the total amount of these structures becomes less than 0.5%, it can be judged that they are not present. The hot rolled steel sheet according to an embodiment of the present invention encompasses hypereutectoid steels which have a C content of more than 0.77%. Generally, in hypereutectoid steel, pro-eutectoid cementite could possibly form within a certain temperature range during cooling, depending on the constituents and the cooling rate. However, since the temperature range at which pro-eutectoid cementite forms is sufficiently narrow and pro-eutectoid cementite forms slowly, the temperature of the steel sheet will fall below the pro-eutectoid cementite formation temperature range during cooling before pro-eutectoid cementite forms, so long as the C content is not more than 0.8%, like in the hot rolled steel sheet according to an embodiment of the present invention, and virtually no pro-eutectoid cementite will be formed. For example, in the method for producing the hot rolled steel sheet, which will be explained in detail later, cooling is performed at a relatively fast cooling rate, which consequently results in a short holding time within the pro-eutectoid cementite formation temperature range, and pro-eutectoid cementite therefore will not be formed or virtually not be formed even if a hypereutectoid with a relatively high C content of 0.80%. For this reason, pro-eutectoid cementite is present in an area ratio of less than 1%.

[Average Lamellar Spacing of Pearlite: 0.08 to 0.30 μm]

The average lamellar spacing of the pearlite is strongly correlated with the strength of steel sheet. The smaller the average lamellar spacing, the higher the strength that is obtained. With a large average lamellar spacing, a strength of a tensile strength 780 MPa or more is not obtained; therefore, the average lamellar spacing of pearlite in the microstructure in a hot rolled steel sheet according to an embodiment of the present invention is 0.30 μm or less, preferably 0.25 μm or less or 0.20 μm or less. Further, if the average lamellar spacing is too small, sometimes there will be a drop in ductility accompanying the improvement in tensile strength. Therefore, the lower limit value of the average lamellar spacing of pearlite is 0.08 μm. The lower limit value of the average lamellar spacing of pearlite is preferably 0.09 μm, more preferably 0.10 μm.

[Percentage of Cementite in Pearlite Having a Major Axis Length of More than 0.3 μm and an Aspect Ratio of Less than 3.0: Less than 15%]

The aspect ratio of cementite is the value of the length of the major axis of cementite revealed in an observed surface divided by the length of the minor axis. Further, cementite having a major axis length of more than 0.3 μm and an aspect ratio of less than 3.0 is defined here to be coarse spheroidal cementite. It was found through studies by the inventors that such coarse spheroidal cementite acts as the starting point of void formation at the time of steel sheet stamping and that an effect in which void formation at the time of steel sheet stamping is suppressed can be obtained by setting the percentage of coarse spheroidal cementite relative to all cementite to be less than or equal to a certain level. To obtain such an effect, the percentage of coarse spheroidal cementite to all cementite in the pearlite is less than 15%, preferably 14% or less, more preferably 12% or less or 10% or less. The lower limit of this percentage is 0% but may be 1% or 3%. Note that, while the details will be explained later, the aspect ratio is the ratio between the major axis length and minor axis length of an ellipse obtained by approximating individual pieces of cementite into ellipses by image processing.

[Method of Judgment and Method of Measurement of Pearlite and Remaining Structures]

The fractions of the pearlite and remaining structure are found in the following way. First, samples are taken from positions of ¼ or ¾ of the thickness from the surface of the steel sheet so that the cross-sections parallel to the rolling direction and the thickness direction of the steel sheet become the observed surfaces. Next, the observed surfaces are polished to a mirror finish, corroded by a picral etchant, then examined for structure using a scanning electron microscope (SEM). The measurement region is 80 μm×150 μm, i.e., 12,000 μm$^2$ and the area ratio of pearlite is calculated using the point calculation method from an obtained structural photograph with a magnification of about 5000× for example. Here, regions of ferrite surrounded by grain boundaries with a misorientation of 15° or more and where there is a mix of a ferrite phase and a cementite phase having a form which is layered and/or spheroidal are judged to be pearlite. Therefore, pearlite encompasses not only structures formed by layered (lamellar) dispersing of the ferrite phase and cementite for example, but also those mainly comprised of cementite dispersed in clumps, more specifically those containing such clump shaped cementite in an area ratio of more than 50% with respect to the total amount of cementite in the structures. The amount of the latter pearlite mainly comprised of the cementite dispersed in clumps is small and may be 10% of the total pearlite or less. Further, cementite in pearlite is about 210 nm (an average of about 100 nm) for even large pieces of cementite, and none exceed 300 nm. Further, assemblies of lath shaped crystal grains which have pluralities of iron-based carbides with major axes of 20 nm or more inside the laths and furthermore have these carbides belonging to groups of iron-based carbides of single variants, i.e., stretched in the same directions, are judged to be bainite. Further, regions of clump like or film like iron-based carbides with circle equivalent diameters of 300 nm or more are judged to be pro-eutectoid cementite. In the case of pearlite structures, the observed inclusions are basically cementite. There is no need to use a scanning electron microscope (SEM-EDS) equipped with an energy dispersive type X-ray spectroscope etc., to identify individual inclusions as cementite or iron-based carbides. It is possible to use SEM-EDS etc., to analyze inclusions, separate from examination by SEM, as required only when a doubt arises as to their being cementite or iron-based carbides. Pro-eutectoid ferrite and residual austenite both have less than 1% area fractions of cementite inside them. If such structures, after examination of the structures by SEM, electron back scatter diffraction (EBSD) is used for analysis and bcc structures are judged as pro-eutectoid ferrite and fcc structures are judged as residual austenite.

[Method of Measurement of Average Lamellar Spacing]

The average lamellar spacing is found as follows: First, samples are taken from positions of ¼ or ¾ of the thickness from the surface of the steel sheet so that the cross-sections parallel to the rolling direction and the thickness direction of the steel sheet become the observed surfaces.

Next, the observed surfaces are polished to a mirror finish, corroded by a picral etchant, then examined for structure using a scanning electron microscope (SEM). The measurement region is 80 μm×150 μm, i.e., 12,000 μm$^2$ (the magnification is for example 5000×). 10 or more locations where the cementite layer vertically traverses the paper surface of the structural photograph are selected. Information on the depth direction is obtained by measurement by corrosion by a picral etchant, so the locations vertically traversing the cementite layer are known. By measurement selecting 10 or more such locations, the lamellar spacings S are found at the respective locations. The average of these is taken to obtain the average lamellar spacing. The method of measurement of the lamellar spacing at the individual locations is as follows: First, a line is drawn vertical to the cementite layers so as to cut across 10 to 30 cementite layers. The lengths of the lines are made "L". The number of cementite layers which that line crosses is defined as "N". At this time, the lamellar spacing S at that location is found by S=L/N. The average lamellar spacing is measured for pearlite formed by the layered (lamellar) dispersing of the ferrite phase and cementite, but the average lamellar spacing is not measured for structures mainly comprised of cementite dispersed in clumps.

[Method of Measurement of Percentage R of Cementite in Pearlite Having a Major Axis Length of More Than 0.3 μm and an Aspect Ratio of Less Than 3.0]

The value of R is found as follows: First, samples are taken from positions of ¼ or ¾ of the thickness from the surface of the steel sheet so that the cross-sections parallel to the rolling direction and the thickness direction of the steel sheet become the observed surfaces. Next, the observed surfaces are polished to a mirror finish, corroded by a picral etchant, then examined for structure using a scanning electron microscope (SEM). The measurement region is 80 μm×150 μm, i.e., 12,000 μm$^2$ (the magnification is for example 5000×). The obtained image is binarized so that the dark portions are ferrite and the light portions are cementite. Individual pieces of cementite among these are approximated into ellipses by image processing, the length of the major axis and length of the minor axis of each ellipse are defined to be the length of the major axis and length of the minor axis of each individual piece of cementite, and the aspect ratio of each individual piece of cementite is defined by the following formula.

$$[\text{aspect ratio}]=[\text{length of major axis}]/[\text{length of minor axis}]$$

The total area of cementite having a major axis length of more than 0.3 μm and an aspect ratio of less than 3.0 as defined in the above method is calculated by image processing in one 80 μm×150 μm visual field, and the value obtained by dividing the result by the total area of all cementite in percentage is the value of R prescribed in the present invention.

[Mechanical Properties]

According to the hot rolled steel sheet having the above chemical composition and structure, high tensile strength, specifically a 780 MPa or more tensile strength, can be achieved. The tensile strength is 780 MPa or more so as to satisfy the demand for lighter weight of car bodies in automobiles. The tensile strength is preferably 880 MPa or more, more preferably 980 MPa or more. The upper limit value does not have to be particularly prescribed, but, for example, the tensile strength may be 1500 MPa or less or 1400 MPa or less. Similarly, according to the hot rolled steel sheet having the above chemical composition and structure, a high ductility can be realized, more specifically a 15% or more, preferably 17% or more, more preferably 20% or more total elongation can be realized. The upper limit value does not have to be particularly prescribed, but, for example, the total elongation may be 40% or less or 30% or less. The tensile strength and the total elongation are measured by taking a JIS Z2241(2011) No. 5 tensile test piece from a direction perpendicular to the rolling direction of the hot rolled steel sheet and subjecting it to a tensile test based on JIS Z2241(2011).

[Thickness]

The hot rolled steel sheet according to an embodiment of the present invention generally has a thickness of 1.0 to 6.0 mm. While not particularly limited, the thickness may be 1.2 mm or more or 2.0 mm or more and/or may be 5.0 mm or less or 4.0 mm or less.

<Method for Producing Hot Rolled Steel Sheet>

Next, a preferable method for producing a hot rolled steel sheet according to an embodiment of the present invention will be explained. The explanation below is intended to illustrate an example of a characteristic method for producing a hot rolled steel sheet according to an embodiment of the present invention and not to limit the hot rolled steel sheet to one produced by the production method explained below.

The preferable method for producing a hot rolled steel sheet according to an embodiment of the present invention comprises heating a slab having a chemical composition explained above to 1150° C. or more, hot rolling including finishing rolling the heated slab, wherein a final pass rolling reduction of the finishing rolling is 20% or more and an exit side temperature FT of the finishing rolling is 750 to 850° C., cooling including cooling (primary cooling) the obtained steel sheet from the finishing rolling exit side temperature to a primary cooling end temperature indicated below by an average cooling rate of 40 to 200° C./s, then leaving the steel sheet to air-cool for 2 to 20 seconds, and cooling (secondary cooling) to a temperature of 560° C. or less by an average cooling rate of 10 to 200° C./s, wherein the primary cooling end temperature is within the range of Ts to Ts+20° C. where Ts is whichever of the temperature Tc calculated in the following formula 1 or the exit side temperature FT−70° C. is lower, and coiling the steel sheet at a coiling temperature of 400 to 550° C.:

$$Tc(°C.)=412.7+411.9\times[C]+21.0\times[Si]+2.7\times[Mn]+114.4\times[Cr] \quad \text{formula 1}$$

where [C], [Si], [Mn] and [Cr] respectively represent the content [mass %] of the respective elements.

Below, each step will be explained in detail.

[Heating of Slab]

First, a slab having the chemical composition explained above is heated before hot rolling. The heating temperature of the slab is 1150° C. or more so as to make the Ti carbonitrides etc., sufficiently redissolve. The upper limit value is not particularly prescribed, but for example may be 1250° C. Further, the heating time is not particularly limited, but for example may be 30 minutes or more and/or may be 120 minutes or less. Note that, the slab used is preferably cast by the continuous casting method from the viewpoint of productivity, but may also be produced by the ingot casting method or thin slab casting method.

[Hot Rolling]

(Roughing Rolling)

In the present method, for example, the heated slab may be roughing rolled before the finishing rolling so as to adjust the thickness, etc. The roughing rolling is not particularly limited in conditions so long as the desired sheet bar dimensions are secured.

(Finishing Rolling)

The heated slab or the slab additionally roughing rolled in accordance with need is next finishing rolled. The final pass rolling reduction of the finishing rolling and exit side temperature FT are controlled to 20% or more and 750 to 850° C. respectively. If the final pass rolling reduction of the finishing rolling is less than 20% and/or the exit side temperature FT is more than 850° C., the work strain in austenite during cooling will not accumulate enough, delaying pearlite transformation and making it difficult for pearlite transformation to be completed before coiling, preventing a pearlite fraction of 90% or more from being achieved. For this reason, the final pass rolling reduction of the finishing rolling is 20% or more, preferably 25% or more, even more preferably 30% or more. The upper limit value of the final pass rolling reduction does not have to be particularly prescribed, but, for example, the final pass rolling reduction may be 50% or less. Likewise, the upper limit of the exit side temperature FT of the finishing rolling is 850° C., preferably 830° C., even more preferably 820° C., in order to achieve a pearlite fraction of 90% or more. From such a viewpoint, it is not necessary to provide a lower limit for the exit side temperature FT of the finishing rolling so long as the Ar3 point or more, but the lower the temperature, the more the deformation resistance of the steel sheet increases. A massive load is applied to the rolling machine and can become the case of equipment trouble. For this reason, the lower limit of the exit side temperature FT of the finishing rolling is 750° C.

[Cooling]

The steel sheet is cooled after the end of finishing rolling. Cooling is broken down into primary cooling, air-cooling, and secondary cooling.

(Average Cooling Rate of Primary Cooling: 40 to 200° C./s)

In the primary cooling, the steel sheet is cooled from the above exit side temperature FT of the finishing rolling by an average cooling rate of 40° C./s down to the primary cooling end temperature. If the average cooling rate down to the above primary cooling end temperature is less than 40° C./s, pro-eutectoid ferrite and/or pro-eutectoid cementite precipitates in a large amount and the above target value of the pearlite fraction (90% or more) is liable to be unable to be achieved. The average cooling rate may be 42° C./s or more or 45° C./s or more. The average cooling rate is preferably 200° C./s or less to obtain the desired structure and may be 100° C./s or less. Note that, the primary cooling end temperature can be selected as appropriate within the range of Ts to Ts+20° C. explained below.

(Primary Cooling End Temperature: Ts to Ts+20° C.)

The cooling ends within the range of Ts to Ts+20° C. where Ts is whichever of the temperature Tc or the exit side temperature FT−70° C. of finishing rolling is lower. Here, Tc is the precipitation temperature of cementite and is expressed by formula 1 below.

$$Tc(°C.)=412.7+411.9\times[C]+21.0\times[Si]+2.7\times[Mn]+114.4\times[Cr] \quad \text{formula 1}$$

Here, [C], [Si], [Mn] and [Cr] respectively represent the content [mass %] of the respective elements. When the primary cooling end temperature is lower than Ts, pearlite transformation is delayed, and pearlite transformation will not occur during the subsequent air-cooling. This results in preventing achievement of a pearlite fraction of 90% or more, or in pearlite transformation occurring after coiling. For example, if pearlite transformation progresses after coiling at a temperature of 550° C. or lower, sometimes the average lamellar spacing of the pearlite will be smaller than 0.08 μm due to an increase in the pearlite formed at such low temperature. Further, a primary cooling end temperature higher than Ts+20° C. will similarly prevent a pearlite fraction of 90% or more from being achieved since ferrite transformation will occur before pearlite transformation and a relatively large amount of pro-eutectoid ferrite will be formed. For this reason, the primary cooling end temperature is specified in the above manner.

(Air-Cooling Time: 2 to 20 Seconds)

By leaving the steel sheet to air-cool for 2 to 20 seconds after the end of the primary cooling, pearlite with few coarse spheroidal carbides is formed. If the air-cooling time is less than 2 seconds or is 0 second, phase transformation (pearlite transformation) will not sufficiently progress in the cooling process, and achievement of a pearlite fraction of 90% or more will be prevented, or pearlite transformation will occur after coiling. For example, if pearlite transformation progresses after coiling at a temperature of 550° C. or lower, sometimes the average lamellar spacing of the pearlite will be smaller than 0.08 μm due to an increase in the pearlite formed at such low temperature. Therefore, the air-cooling time is 2 seconds or more, preferably 3 seconds or more, even more preferably 5 seconds or more, in order to complete phase transformation with a pearlite fraction of 90% or more in cooling. The upper limit of the air-cooling time does not have to be particularly prescribed, but the upper limit of the air-cooling time is set to 20 seconds from the viewpoint of productivity. The upper limit of the air-cooling time may be 15 seconds.

(Secondary Cooling)

Secondary cooling is performed between the above air-cooling and the coiling described below. As explained earlier, by air-cooling the steel sheet for 2 seconds or more after the end of primary cooling, it is possible to complete phase transformation with a pearlite fraction of 90% or more, and furthermore, as will be explained below, by setting the coiling temperature to 550° C. or less, it is possible to suppress spheroidization of cementite. For this reason, cooling between the 2 to 20 second long air-cooling of the cooling process and the coiling process is not particularly restricted aside from cooling being performed at an average cooling rate of 10 to 200° C./s. While the average cooling rate of secondary cooling does not have a large effect on the microstructure of the steel sheet, unevenness tends to occur more readily in the temperature across the steel sheet the higher the average cooling rate. For this reason, the average cooling rate of secondary cooling is 200° C./s or lower and may be 100° C./s or lower. The average cooling rate of secondary cooling is 10° C./s or more from the viewpoint of productivity and may be 20° C./s or more.

Further, the end temperature of secondary cooling does not have to be the same as the coiling temperature, and it is sufficient for the end temperature be 560° C. or lower from the viewpoint of controlling the coiling temperature. The lower limit of the secondary cooling end temperature is not particularly prescribed, but the secondary cooling end temperature for example may be 400° C. or more. Coiling may be performed immediately after the end of the secondary cooling, and cooling (air-cooling) may be performed after the end of secondary cooling until the coiling.

[Coiling]

After cooling, the steel sheet, which has completed a certain level of phase transformation during cooling, is coiled. The temperature of the steel sheet at the time of coiling is 400 to 550° C. A coiling temperature of more than 550° C. prolongs the time spent in the temperature region at which subsequent spheroidization and coarsening of cementite occurs, causing the layered cementite in the pearlite formed during cooling to spheroidize, creating a large amount of coarse spheroidal cementite which could become the starting points of voids at the time of stamping. This sometimes results in the formation of a structure which does not satisfy the characteristics of the percentage of cementite in the pearlite having a major axis length of more than 0.3 μm and an aspect ratio of less than 3.0 being less than 15%. For this reason, the coiling temperature is 550° C. or lower and may be 540° C. or lower or 530° C. or lower. Further, when the coiling temperature is less than 400° C., hard structures such as bainite and martensite are formed, causing a drop in the elongation of the steel sheet. For this reason, the coiling temperature is 400° C. or more and may be 420° C. or more or 440° C. or more. In the present production method, as explained earlier, the coiling temperature does not particularly affect the average lamellar spacing of the pearlite since pearlite transformation is completed in the cooling process by 2 to 20 seconds of air-cooling after the end of primary cooling.

Below, examples will be used to explain the present invention in more detail, but the present invention is not limited by these examples in any way.

EXAMPLES

In the following examples, hot rolled steel sheets according to an embodiment of the present invention were produced under various conditions and the mechanical properties of the obtained hot rolled steel sheets were investigated.

First, the continuous casting method was used to produce slabs having the chemical compositions shown in Table 1. Next, the heating, hot rolling, cooling, and coiling conditions shown in Table 2 were used to produce thickness 2.5 mm hot rolled steel sheets from these slabs. Note that, the balances aside from the constituents shown in Table 1 are comprised of Fe and impurities. Further, the chemical compositions obtained by analyzing samples taken from the produced hot rolled steel sheets were equal to the chemical compositions of the slabs shown in Table 1.

TABLE 1

| Steel type | Chemical composition (mass %, balance: Fe and impurities) | | | | | | | | | | | | | | | | | Tc [° C.] |
|---|---|---|---|---|---|---|---|---|---|---|---|---|---|---|---|---|---|---|
| | C | Si | Mn | P | S | Al | N | Cr | Ti | Nb | V | Cu | Ni | Mo | B | Ca | REM | |
| A | 0.49 | 0.45 | 1.20 | 0.010 | 0.0051 | 0.030 | 0.0032 | 0.32 | — | — | — | — | — | — | — | — | — | 664 |
| B | 0.40 | 0.27 | 1.86 | 0.013 | 0.0020 | 0.007 | 0.0028 | 0.52 | 0.30 | — | — | — | — | — | — | — | — | 648 |
| C | 0.31 | 0.16 | 0.70 | 0.031 | 0.0087 | 0.001 | 0.0061 | 0.82 | — | 0.08 | — | — | — | — | — | — | — | 639 |
| D | 0.63 | 0.34 | 0.64 | 0.011 | 0.0084 | 0.003 | 0.0084 | 0.31 | — | — | 0.40 | — | — | — | — | — | — | 717 |

TABLE 1-continued

| Steel type | Chemical composition (mass %, balance: Fe and impurities) | | | | | | | | | | | | | | | | | | Tc [° C.] |
|---|---|---|---|---|---|---|---|---|---|---|---|---|---|---|---|---|---|---|---|
| | C | Si | Mn | P | S | Al | N | Cr | Ti | Nb | V | Cu | Ni | Mo | B | Ca | REM | | |
| E | 0.74 | 0.46 | 1.58 | 0.010 | 0.0064 | 0.005 | 0.0066 | 0.30 | — | — | — | — | — | — | 0.0050 | 0.0036 | — | | 766 |
| F | 0.26 | 0.09 | 1.17 | 0.009 | 0.0083 | 0.004 | 0.0089 | 0.62 | — | — | — | — | — | — | — | — | — | | 596 |
| G | 0.82 | 0.05 | 0.55 | 0.089 | 0.0087 | 0.006 | 0.0080 | 0.30 | — | — | — | — | — | — | — | — | — | | 787 |
| H | 0.55 | 0.19 | 1.85 | 0.0021 | 0.004 | 0.0016 | 0.25 | — | — | — | — | — | — | — | — | — | — | | 677 |
| I | 0.45 | 0.13 | 0.88 | 0.010 | 0.0087 | 0.009 | 0.0089 | 1.20 | — | — | — | — | — | — | — | — | — | | 740 |
| J | 0.50 | 0.20 | 1.30 | 0.010 | 0.0050 | 0.026 | 0.0030 | 0.60 | — | — | — | 0.20 | — | — | — | — | — | | 695 |
| K | 0.49 | 0.20 | 1.30 | 0.013 | 0.0046 | 0.045 | 0.0045 | 0.61 | — | — | — | — | 0.40 | — | — | — | — | | 692 |
| L | 0.50 | 0.21 | 1.00 | 0.011 | 0.0058 | 0.035 | 0.0032 | 0.59 | — | — | — | — | — | 0.05 | — | — | — | | 693 |
| M | 0.40 | 0.03 | 1.29 | 0.010 | 0.0060 | 0.030 | 0.0033 | 0.60 | — | — | — | — | — | — | — | 0.002 | — | | 650 |
| N | 0.51 | 0.02 | 0.60 | 0.010 | 0.0059 | 0.030 | 0.0030 | 0.52 | — | — | — | — | — | — | — | — | — | | 684 |

Underlines show outside scope of present invention.
"—"in table show corresponding chemical constituent not intentionally added.

TABLE 2

| Test No. | Steel type | Tc [° C.] | Heating | | Hot rolling | | Cooling | | | | | | | Coiling | Remarks |
|---|---|---|---|---|---|---|---|---|---|---|---|---|---|---|---|
| | | | | | Finishing rolling | Finishing rolling | Primary cooling | | Primary cooling | | Secondary cooling | Secondary cooling | | | |
| | | | Heating temperature [° C.] | Heating time [min] | final pass reduction [%] | exit side temperature [° C.] | average cooling rate [° C./s] | Ts [° C.] | end temperature [° C.] | Air-cooling time [s] | average cooling rate [° C./s] | end temperature [° C.] | Coiling temperature [° C.] | | |
| 1 | A | 664 | 1200 | 60 | 25 | 755 | 60 | 664 | 671 | 8 | 25 | 554 | 540 | Ex. |
| 2 | A | 664 | 1200 | 60 | 25 | 770 | 55 | 664 | 670 | 6 | 29 | 535 | 530 | Ex. |
| 3 | A | 664 | 1200 | 60 | 30 | 822 | 60 | 664 | 680 | 4 | 41 | 514 | 500 | Ex. |
| 4 | A | 664 | 1200 | 60 | 30 | 802 | 60 | 664 | 679 | 3 | 62 | 435 | 420 | Ex. |
| 5 | A | 664 | 1200 | 60 | 40 | 760 | 55 | 664 | 682 | 2 | 51 | 485 | 470 | Ex. |
| 6 | A | 664 | 1200 | 60 | 15 | 787 | 45 | 664 | 670 | 2 | 33 | 543 | 530 | Comp, ex |
| 7 | A | 664 | 1200 | 60 | 30 | 869 | 70 | 664 | 679 | 6 | 49 | 473 | 460 | Comp, ex |
| 8 | A | 664 | 1200 | 60 | 30 | 770 | 35 | 664 | 670 | 6 | 54 | 436 | 430 | Comp, ex |
| 9 | A | 664 | 1200 | 60 | 30 | 810 | 95 | 664 | 640 | 5 | 33 | 497 | 490 | Comp, ex |
| 10 | A | 664 | 1200 | 60 | 30 | 764 | 60 | 664 | 705 | 6 | 55 | 474 | 460 | Comp, ex |
| 11 | A | 664 | 1200 | 60 | 25 | 850 | 45 | 664 | 683 | 1 | 40 | 531 | 520 | Comp, ex |
| 12 | A | 664 | 1200 | 60 | 30 | 831 | 65 | 664 | 670 | 3 | 75 | 369 | 360 | Comp, ex |
| 13 | A | 664 | 1200 | 60 | 30 | 835 | 60 | 664 | 678 | 5 | 20 | 592 | 580 | Comp, ex |
| 14 | B | 648 | 1250 | 60 | 40 | 845 | 65 | 648 | 650 | 2 | 36 | 513 | 500 | Ex. |
| 15 | B | 648 | 1250 | 60 | 30 | 800 | 45 | 648 | 627 | 3 | 19 | 550 | 540 | Comp, ex |
| 16 | B | 648 | 1250 | 60 | 30 | 800 | 45 | 648 | 680 | 3 | 32 | 555 | 540 | Comp, ex |
| 17 | C | 639 | 1250 | 60 | 30 | 843 | 65 | 639 | 651 | 4 | 24 | 548 | 540 | Ex. |
| 18 | D | 717 | 1250 | 60 | 40 | 760 | 45 | 690 | 695 | 3 | 38 | 542 | 530 | Ex. |
| 19 | E | 766 | 1200 | 60 | 40 | 759 | 42 | 689 | 700 | 4 | 41 | 530 | 520 | Ex. |
| 20 | F | 596 | 1200 | 60 | 30 | 820 | 45 | 596 | 610 | 3 | 15 | 552 | 540 | Comp, ex |
| 21 | G | 787 | 1200 | 60 | 30 | 752 | 45 | 682 | 695 | 3 | 36 | 546 | 540 | Comp, ex |
| 22 | H | 677 | 1200 | 60 | 30 | 830 | 45 | 677 | 690 | 3 | 35 | 549 | 540 | Comp, ex |
| 23 | I | 740 | 1200 | 60 | 30 | 759 | 45 | 689 | 695 | 3 | 38 | 544 | 530 | Comp, ex |
| 24 | J | 695 | 1200 | 60 | 35 | 822 | 50 | 695 | 700 | 4 | 41 | 529 | 520 | Ex. |
| 25 | K | 692 | 1200 | 60 | 35 | 795 | 50 | 692 | 701 | 4 | 41 | 526 | 520 | Ex. |
| 26 | L | 693 | 1200 | 60 | 35 | 835 | 50 | 693 | 699 | 4 | 38 | 537 | 530 | Ex. |
| 27 | M | 650 | 1200 | 60 | 35 | 830 | 50 | 650 | 660 | 4 | 31 | 525 | 520 | Ex. |
| 28 | N | 684 | 1200 | 60 | 30 | 845 | 50 | 684 | 692 | 0 | 12 | 675 | 670 | Comp, ex |
| 29 | N | 684 | 1200 | 60 | 30 | 848 | 50 | 684 | 692 | 0 | 17 | 546 | 540 | Comp, ex |

Underlines show outside preferable scope of present invention.

A JIS Z2241(2011) No. 5 tensile test piece was taken from each of the thus obtained hot rolled steel sheets in a direction perpendicular to the rolling direction and subjected to a tensile test based on JIS Z2241(2011) to measure the tensile strength (TS) and total elongation (El). Further, the presence or absence of voids at the time of stamping was measured with the following method. First, a 10 mm diameter hole was punched with a punching clearance of 12.5%, and the steel sheet was cut at a cross-section going through the center of the hole and parallel to the rolling direction. Next, the cross-section was polished to a mirror finish, after which a picral etchant was used to reveal the microstructure, and a region within 50 μm from the end face was observed at a magnification of 5000X using SEM. If voids with circle equivalent diameters of 0.2 μm or more are found, voids are considered to be present, and if none are found, voids are considered to be absent. Cases where the TS is 780 MPa or more, the El is 15% or more, and voids at the time of stamping are not present are evaluated to be hot rolled steel sheets high in strength and excellent in ductility and in suppressing void formation. The results are shown in Table 3 below. The remaining structure in Table 3 indicates structures aside from pearlite; accordingly, this means that besides pearlite, structures other than those indicated as the remaining structure are not contained.

stamping were not present. As shown by FIG. 1(a), it is understood that in a hot rolled steel sheet corresponding to these examples, the microstructure is mainly comprised of pearlite, the lamellar spacing of the pearlite becomes finer, and furthermore the percentage of coarse spheroidal cementite in the pearlite is reduced.

As opposed to these, in Comparative Example 6, phase transformation was not promoted due to the final pass rolling reduction of the finishing rolling being low, resulting in a drop in pearlite fraction and preventing a sufficient tensile strength from being obtained. In Comparative Example 7, phase transformation was not promoted due to the exit side temperature of finishing rolling being high, resulting in a drop in pearlite fraction and preventing a sufficient tensile strength from being obtained. In Comparative Example 8, phase transformation occurred during cooling due to the average cooling rate being low, resulting in a drop in pearlite fraction and preventing a sufficient tensile strength from being obtained. In Comparative Examples 9 and 15, bainite was formed due to the primary cooling end temperature being low, preventing a sufficient ductility from being obtained. In Comparative Examples 10 and 16, pro-eutectoid ferrite was formed in a relatively large amount during air-cooling due to the primary cooling end temperature being high, preventing a sufficient tensile strength from

TABLE 3

| | | | | | Micro structure | | | | | |
| | | | | | | Average lamellar spacing [μm] | Coarse spheroidal cementite percentage [%] | Mechanical properties | | |
| Test no. | Steel type | Thickness [mm] | Pearlite fraction [%] | Remaining structure [%] | | | | TS [MPa] | El [%] | Void formation at time of stamping | Remarks |
|---|---|---|---|---|---|---|---|---|---|---|---|
| 1 | A | 2.5 | 100 | — | | 0.09 | 8 | 961 | 18 | Absent | Ex. |
| 2 | A | 2.5 | 100 | — | | 0.10 | 10 | 978 | 17 | Absent | Ex. |
| 3 | A | 2.5 | 98 | Pro-eutectoid ferrite: 2 | | 0.11 | 8 | 921 | 19 | Absent | Ex. |
| 4 | A | 2.5 | 95 | Pro-eutectoid ferrite: 5 | | 0.15 | 5 | 816 | 20 | Absent | Ex. |
| 5 | A | 2.5 | 91 | Pro-eutectoid ferrite: 9 | | 0.13 | 3 | 820 | 19 | Absent | Ex. |
| 6 | A | 2.5 | 84 | Pro-eutectoid ferrite: 16 | | 0.10 | 8 | 771 | 21 | Absent | Comp, ex |
| 7 | A | 2.5 | 79 | Pro-eutectoid ferrite: 21 | | 0.10 | 3 | 753 | 22 | Absent | Comp, ex |
| 8 | A | 2.5 | 73 | Pro-eutectoid ferrite: 27 | | 0.18 | 9 | 768 | 21 | Absent | Comp, ex |
| 9 | A | 2.5 | 10 | Bainite: 90 | | 0.09 | 24 | 890 | 12 | Present | Comp, ex |
| 10 | A | 2.5 | 60 | Pro-eutectoid ferrite: 40 | | 0.11 | 6 | 743 | 24 | Absent | Comp, ex |
| 11 | A | 2.5 | 80 | Bainite: 20 | | 0.09 | 8 | 1140 | 11 | Absent | Comp, ex |
| 12 | A | 2.5 | 85 | Bainite: 15 | | 0.08 | 10 | 1189 | 12 | Absent | Comp, ex |
| 13 | A | 2.5 | 95 | Pro-eutectoid ferrite: 5 | | 0.10 | 20 | 1132 | 15 | Present | Comp, ex |
| 14 | B | 2.5 | 91 | Pro-eutectoid ferrite: 9 | | 0.10 | 5 | 803 | 21 | Absent | Ex |
| 15 | B | 2.5 | 15 | Bainite: 85 | | 0.09 | 18 | 963 | 12 | Present | Comp, ex |
| 16 | B | 2.5 | 76 | Pro-eutectoid ferrite: 24 | | 0.11 | 13 | 751 | 22 | Absent | Comp, ex |
| 17 | C | 2.5 | 95 | Pro-eutectoid ferrite: 5 | | 0.11 | 12 | 804 | 22 | Absent | Ex. |
| 18 | D | 2.5 | 100 | — | | 0.14 | 10 | 794 | 20 | Absent | Ex. |
| 19 | E | 2.5 | 100 | — | | 0.17 | 14 | 1238 | 15 | Absent | Ex. |
| 20 | F | 2.5 | 67 | Pro-eutectoid ferrite: 33 | | 0.09 | 31 | 635 | 26 | Present | Comp, ex |
| 21 | G | 2.5 | 95 | Pro-eutectoid cementite: 5 | | 0.09 | 21 | 1077 | 13 | Present | Comp, ex |
| 22 | H | 2.5 | 93 | Pro-eutectoid ferrite: 7 | | 0.10 | 28 | 1109 | 15 | Present | Comp, ex |
| 23 | I | 2.5 | 96 | Pro-eutectoid ferrite: 4 | | 0.05 | 14 | 1214 | 14 | Absent | Comp, ex |
| 24 | J | 2.5 | 95 | Pro-eutectoid ferrite: 5 | | 0.12 | 8 | 856 | 19 | Absent | Ex. |
| 25 | K | 2.5 | 92 | Pro-eutectoid ferrite: 8 | | 0.13 | 6 | 842 | 20 | Absent | Ex. |
| 26 | L | 2.5 | 96 | Pro-eutectoid ferrite: 4 | | 0.10 | 5 | 872 | 19 | Absent | Ex. |
| 27 | M | 2.5 | 95 | Pro-eutectoid ferrite: 5 | | 0.12 | 11 | 861 | 19 | Absent | Ex. |
| 28 | N | 2.5 | 100 | — | | 0.18 | 35 | 986 | 15 | Present | Comp, ex |
| 29 | N | 2.5 | 100 | — | | 0.07 | 3 | 1242 | 14 | Absent | Comp, ex |

Underlines show outside scope of present invention.

As is clear from Table 3, in each of Examples 1 to 5, 14, 17 to 19, and 24 to 27 included within the scope of the present invention, a hot rolled steel sheet high in strength and excellent in ductility and in suppressing void formation could be obtained since the tensile strength was 780 MPa or more, the El was 15% or more, and voids at the time of stamping were not present.

being obtained. In Comparative Example 11, phase transformation was not completed during cooling due to the air-cooling time being short, resulting in bainite being formed during coiling and preventing a sufficient ductility from being obtained. In Comparative Example 12, bainite was similarly formed due to the coiling temperature being low, preventing a sufficient ductility from being obtained. In Comparative Example 13, cementite spheroidized after coiling due to the coiling temperature being high, resulting in an increase in the percentage of coarse spheroidal cementite and voids being formed at the time of stamping. In Comparative Example 20, the pro-eutectoid ferrite fraction increased due to the C content being low, preventing a sufficient tensile strength from being obtained. In Comparative Example 21, pro-eutectoid cementite was formed due to the C content being excessive, preventing a sufficient ductility from being obtained. In Comparative Example 22, the cementite spheroidization suppressing effect provided by Cr could not be sufficiently demonstrated due to the Cr content being low, resulting in an increase in the percentage of coarse spheroidal cementite and voids being formed at the time of stamping. In Comparative Example 23, the average lamellar spacing of the pearlite became excessively fine due to the Cr content being excessive, resulting in a drop in ductility accompanying improvement in tensile strength. In Comparative Example 28, pearlite transformation occurred after coiling due to the air-cooling time being 0 second and furthermore cementite spheroidized after coiling due to the coiling temperature being high, resulting in an increase in the percentage of coarse spheroidal cementite and voids being formed at the time of stamping. In Comparative Example 29, phase transformation progressed after coiling at a low temperature due to the air-cooling time being 0 second, resulting in the average lamellar spacing of the pearlite becoming excessively fine and a drop in ductility accompanying improvement in tensile strength. FIG. 1(b) shows a hot rolled steel sheet corresponding to a comparative example in which voids were observed at the time of stamping, and referring to this, it is found that many micro voids were formed.

The invention claimed is:

1. A hot rolled steel sheet comprising a chemical composition comprising, by mass %,
C: 0.30 to 0.80%,
Si: 0.01 to 0.50%,
Mn: 0.50 to 2.00%,
P: 0.100% or less,
S: 0.0100% or less,
Al: 0.100% or less,
N: 0.0100% or less,
Cr: 0.30 to 1.00%,
Ti: 0 to 1.00%,
Nb: 0 to 0.10%,
V: 0 to 1.00%,
Cu: 0 to 1.00%,
Ni: 0 to 2.00%,
Mo: 0 to 0.40%,
B: 0 to 0.0100%,
Ca: 0 to 0.0050%,
REM: 0 to 0.005%, and
balance: Fe and impurities, and
a microstructure comprising, by area ratio,
pearlite: 90 to 100% and
pro-eutectoid ferrite: 0 to 10%, wherein
the pearlite has an average lamellar spacing of 0.08 to 0.30 μm,
the percentage of cementite in the pearlite having a major axis length of more than 0.3 μm and an aspect ratio of less than 3.0 is less than 15%,
the hot rolled steel sheet is not subjected to cold rolling, and
the tensile strength is 780 MPa or more and 1400 MPa or less.

2. The hot rolled steel sheet according to claim 1, wherein the chemical composition comprises, by mass %, one or more selected from the group of
Ti: 0.01 to 1.00%,
Nb: 0.01 to 0.10%,
V: 0.01 to 1.00%,
Cu: 0.01 to 1.00%,
Ni: 0.10 to 2.00%,
Mo: 0.01 to 0.40%,
B: 0.0005 to 0.0100%,
Ca: 0.0005 to 0.0050%, and
REM: 0.0005 to 0.005%.

3. The hot rolled steel sheet according to claim 1, wherein the total elongation is 15% or more.

4. The hot rolled steel sheet according to claim 2, wherein the total elongation is 15% or more.

5. The hot rolled steel sheet according to claim 1, wherein the content of C is 0.30 to 0.65%.

6. The hot rolled steel sheet according to claim 2, wherein the content of C is 0.30 to 0.65%.

7. The hot rolled steel sheet according to claim 3, wherein the content of C is 0.30 to 0.65%.

8. The hot rolled steel sheet according to claim 4, wherein the content of C is 0.30 to 0.65%.

9. The hot rolled steel sheet according to claim 1, wherein the thickness is 1.0 to 6.0 mm.

10. The hot rolled steel sheet according to claim 2, wherein the thickness is 1.0 to 6.0 mm.

11. The hot rolled steel sheet according to claim 3, wherein the thickness is 1.0 to 6.0 mm.

12. The hot rolled steel sheet according to claim 4, wherein the thickness is 1.0 to 6.0 mm.

13. The hot rolled steel sheet according to claim 5, wherein the thickness is 1.0 to 6.0 mm.

14. The hot rolled steel sheet according to claim 6, wherein the thickness is 1.0 to 6.0 mm.

15. The hot rolled steel sheet according to claim 7, wherein the thickness is 1.0 to 6.0 mm.

16. The hot rolled steel sheet according to claim 8, wherein the thickness is 1.0 to 6.0 mm.

* * * * *